US012651896B2

(12) United States Patent
Rong et al.

(10) Patent No.: US 12,651,896 B2
(45) Date of Patent: Jun. 9, 2026

(54) GENERATOR CIRCUIT BREAKER

(71) Applicant: XI'AN JIAOTONG UNIVERSITY, Xi'an (CN)

(72) Inventors: Mingzhe Rong, Xi'an (CN); Fei Yang, Xi'an (CN); Yifei Wu, Xi'an (CN); Jinru Sun, Xi'an (CN); Yi Wu, Xi'an (CN); Chunping Niu, Xi'an (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 35 days.

(21) Appl. No.: 18/543,735

(22) Filed: Dec. 18, 2023

(65) Prior Publication Data

US 2024/0235181 A1      Jul. 11, 2024

(51) Int. Cl.
*H02H 7/06*          (2006.01)
*H02H 1/00*          (2006.01)
(52) U.S. Cl.
CPC ............ *H02H 7/06* (2013.01); *H02H 1/0007* (2013.01)
(58) Field of Classification Search
CPC ............................... H02H 7/06; H02H 1/0007
See application file for complete search history.

(56) References Cited

U.S. PATENT DOCUMENTS

| | | | | |
|---|---|---|---|---|
| 5,452,170 | A | * | 9/1995 | Ohde ................... H01H 33/596 |
| | | | | 361/13 |
| 10,476,255 | B2 | * | 11/2019 | Kim ......................... H04B 3/00 |
| 2013/0020881 | A1 | * | 1/2013 | Panousis .............. H01H 33/596 |
| | | | | 307/113 |
| 2016/0204595 | A1 | * | 7/2016 | Park ......................... H02H 3/16 |
| | | | | 361/10 |
| 2016/0285250 | A1 | * | 9/2016 | Lee ........................... H01H 9/54 |
| 2016/0322177 | A1 | * | 11/2016 | Hwang ................ H01H 33/596 |

* cited by examiner

*Primary Examiner* — Scott Bauer

(57) ABSTRACT

A generator circuit breaker includes a main current branch, a current-limiting transfer branch, a freewheeling branch and a fast switch. The main current branch includes a high-speed mechanical switch S1 and a high-speed mechanical switch S2 in parallel, wherein two ends of each of breaks of the high-speed mechanical switch S1 and the high-speed mechanical switch S2 are directly connected with wire outlet ends of the circuit breaker respectively. One end of the current-limiting transfer branch is connected in parallel to one end of the main current branch and the other end of the current-limiting transfer branch is connected with the other end of the main current branch via a fast switch S3, wherein the current-limiting transfer branch includes a transfer capacitor C, an inductor L, thyristor components T1 and T2, and a current-limiting resistor R.

9 Claims, 13 Drawing Sheets

GENERATOR CIRCUIT BREAKER

CROSS-REFERENCE TO RELATED APPLICATION

This application claims priority from the Chinese patent application 2023100294343 filed Jan. 9, 2023, the content of which is incorporated herein in the entirety by reference.

TECHNICAL FIELD

The present disclosure relates to the technical field of circuit breakers, in particular to a generator circuit breaker.

BACKGROUND

In large power plants, a generator breaker is a core device that safeguards the safe and reliable operation of a system. The conventional generator circuit breaker is mainly based on SF6 or vacuum medium to achieve arc extinguishing and disconnection, and has the problems of slow response speed, long action time, insufficient disconnection capacity, so that it is difficult to meet future fault protection requirements of generator sets of millions of kilowatts or above. In response to the shortcomings of the above disconnection solution, the present disclosure provides a large-capacity fast generator circuit breaker based on suppression through current transfer, which achieves fast current limiting and disconnection of generator short-circuit current by combination of current limiting through forcing current transfer and high-speed mechanical switches, and has the advantages of fast disconnection speed, strong current suppression capability, large disconnection capacity, or the like, and can meet the operating requirements of large power generation systems.

The above information disclosed in the background section is only for enhancement of understanding of the background of the present disclosure and therefore may contain information that does not constitute the prior art that is well known to those of ordinary skill in the art.

SUMMARY

In response to the above shortcomings or drawbacks of the prior art, a generator circuit breaker is provided to rapidly limit generator short-circuit fault by controlling high-speed mechanical switches to act, then triggering the use of transfer and current-limiting branches according to a specific timing sequence to achieve rapid current transferring and limiting, and finally completing disconnection at a zero-crossing point, and has the function of disconnection of currents in different through-current directions.

The objective of the present disclosure is achieved by the following technical solution.

A generator circuit breaker includes:

a main current branch, a current-limiting transfer branch, a freewheeling branch and a fast switch.

The main current branch includes a high-speed mechanical switch S1 and a high-speed mechanical switch S2 in parallel, and two ends of breaks of the high-speed mechanical switch S1 and the high-speed mechanical switch S2 are directly connected with wire outlet ends of the circuit breaker respectively.

One end of the current-limiting transfer branch is connected in parallel to one end of the main current branch and the other end of the current-limiting transfer branch is connected with the other end of the main current branch via a fast switch S3, and the current-limiting transfer branch includes a transfer capacitor C, an inductor L, a thyristor component T1, a thyristor componentT2, and a current-limiting resistor R.

The freewheeling branch is connected in parallel across the main current branch and the current-limiting transfer branch, and the freewheeling branch includes thyristor components T3 and T4.

In the current-limiting transfer branch in the generator circuit breaker, the transfer capacitor C and the inductor L are connected in series with the thyristor components T1 and T2, then are connected in parallel with the current-limiting resistor R, and subsequently are connected in series with the fast switch S3.

In a normal through-current state of a system, system current flows from the main current branch, and the high-speed mechanical switch S1 and the high-speed mechanical switch S2 suffer from rated through-current.

In the generator circuit breaker, when forward short-circuit current is disconnected, a control system issues a switching-off action command to the high-speed mechanical switch S1 and the high-speed mechanical switch S2 simultaneously.

In the generator circuit breaker, when the high-speed mechanical switch S1 and the high-speed mechanical switch S2 are pulled apart for an opening distance within 2-5 ms, the thyristor component T1 and the thyristor component T3 are triggered to be switched on.

Current starts to be transferred to the current-limiting transfer branch, and freewheels through the thyristor component T3. After zero crossing of freewheeling current, as voltage of the capacitor rises, the current enters the current-limiting transfer branch, and fault current is limited. When the current is limited, the control system issues a switching command to the fast switch S3, and the current in the fast switch S3 is subjected to arc extinguishing after zero crossing, thereby completing limiting and disconnection of short-circuit current.

In the generator circuit breaker, in a reverse disconnection condition, the thyristor component T1 is triggered first, the current-limiting transfer branch for the inductor L and the transfer capacitor C is subjected to one-time current oscillation first, the voltage of the capacitor is reversed, and the thyristor component T1 is switched off after zero crossing of current. Afterwards, the control system issues a switching-off action command to the high-speed mechanical switch S1 and the high-speed mechanical switch S2 simultaneously, and the thyristor component T2 and the thyristor component T4 are triggered to be switched on when the high-speed mechanical switch S1 and the high-speed mechanical switch S2 are pulled apart for an opening distance within 2-5 ms.

Current starts to be transferred to the current-limiting transfer branch for the inductor L and the capacitor C, and freewheels through the thyristor component T4. After zero crossing of freewheeling current, as voltage of the capacitor rises, the current enters the current-limiting transfer branch, and fault current is limited. When the current is limited, the control system issues a switching command to the fast switch S3, and current in the fast switch S3 is subjected to arc extinguishing after zero crossing, thereby completing limiting and disconnection of short-circuit current.

In the generator circuit breaker, the high-speed mechanical switch S1 and the high-speed mechanical switch S2 are vacuum switches based on electromagnetic repulsion. When the rated current and the short-circuit current increase, the number of the high-speed mechanical switches in parallel can be increased according to current demands.

In the generator circuit breaker, the fast switch S3 is a vacuum fast switch.

In the generator circuit breaker, the transfer capacitor C includes any one of or a combination of more of a thin film capacitor, an organic dielectric capacitor, an inorganic dielectric capacitor, an electrolytic capacitor, an electrothermal capacitor, and an air dielectric capacitor.

The circuit elements of the present disclosure are connected in such a connection manner and controlled in such a timing sequence to provide for disconnection of AC high current in which the peak value of the generator short-circuit current is large and DC components are high. The magnitude of the short-circuit current varies for different systems, and the peak value of the short-circuit current can reach 575 kA or above in large capacity systems, and an asymmetrical coefficient representing the magnitude of the DC component can be greater than 130%. The generator circuit breaker can achieve rapid disconnection of current after rapid current limiting, greatly reduce the test on arc time and arc energy of an arc extinguishing chamber, and significantly improve the capability of disconnection of high current. A single arc extinguishing chamber does not have the adequate capability to achieve disconnection of high current. The rapid limiting and disconnection of the generator short-circuit current are achieved by the manner of parallel connection of a plurality of fast switches on the main current branch, and synchronous action of the rapid switches in parallel connection, which has the advantages of fast disconnection speed, strong current suppression capability, large disconnection capacity, or the like, and can meet the operating requirements of large power generation systems.

The above description is only an overview of the technical solutions of the present disclosure. The specific embodiments of the present disclosure will be illustrated below in order to make technical means of the present disclosure more clearer and more readily understandable to the extent that those skilled in the art can implement according to the contents of the specification, and in order to make the above description and other objectives, features and advantages of the present disclosure more readily understandable.

BRIEF DESCRIPTION OF THE DRAWINGS

Various additional advantages and benefits of the present disclosure will become apparent to those of ordinary skill in the art upon reading the following detailed description of the preferred specific embodiments. The drawings are only for the purpose of illustrating preferred embodiments and are not considered to be limitation of the present disclosure. It is obvious that the drawings described below are merely some embodiments of the present disclosure, and those of ordinary skill in the art can also obtain other drawings according to these drawings without creative efforts. Moreover, same reference numerals refer to same parts throughout the drawings.

In the drawings.

Figure 1:
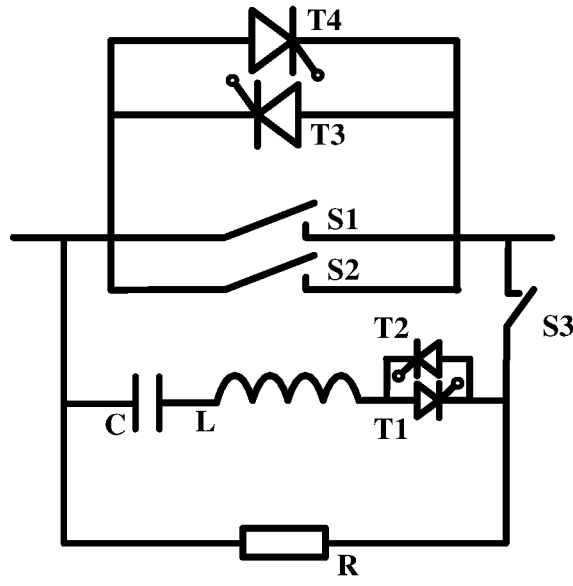
FIG. 1 is a topological diagram showing bi-directional disconnection of a generator circuit breaker according to an embodiment of the present disclosure.

The present disclosure is further explained below with reference to the drawings and embodiments.

DETAILED DESCRIPTION OF THE EMBODIMENTS

The specific embodiments of the present disclosure will be described in more detail below with reference to the FIGS. 1-7. Although the specific embodiments of the present disclosure are illustrated in the drawings, it should be understood that the present disclosure may be implemented in various forms and should not be construed as being limited to the embodiments set forth herein. On the contrary, these embodiments are provided so that the present disclosure will be more fully understood, and will fully convey the scope of the present disclosure to those skilled in the art.

It should be noted that certain terms are used throughout the description and claims to refer to certain components. Those skilled in the art that should understand that different terms may be used by technicians to refer to the same component. The description and claims do not use differences in nouns as a way to distinguish components, but use differences in function of components as criteria for distinguishing. "Comprise" or "include" as referred to throughout the description and claims, is an open-ended language that is to be interpreted as "including, but not limited to". The following description describes preferred embodiments for implementing the present disclosure, but the description is for the purpose of general principles of the description and is not intended to limit the scope of the present disclosure. The scope of the present disclosure is defined by the appended claims.

In order to facilitate the understanding of the embodiments of the present disclosure, several specific embodiments will be further described by way of example with reference to the drawings that are not to be construed as limiting the embodiments of the present disclosure.

As shown in FIGS. 1-7, a generator circuit breaker includes a main current branch, a current-limiting transfer branch, a freewheeling branch and a fast switch. The main current branch includes a high-speed mechanical switch S1 and a high-speed mechanical switch S2 in parallel, wherein two ends of each of breaks of the high-speed mechanical switch S1 and the high-speed mechanical switch S2 are directly connected with wire outlet ends of the circuit breaker respectively. Two ends of the current-limiting transfer branch are connected in parallel with two ends of the main current branch, wherein a transfer capacitor C and an inductor L are connected in series with a thyristor component T1 and a thyristor component T2, and then are connected in parallel with a current-limiting resistor R. The freewheeling branch is connected in parallel across the main current branch and the current-limiting transfer branch, and includes a thyristor component T3 and a thyristor component T4. A fast switch S3 is located between the current-limiting transfer branch and the main current branch.

In a preferred embodiment of the generator circuit breaker, in a normal through-current state of a system, system current flows from the main current branch, and the high-speed mechanical switch S1 and the high-speed mechanical switch S2 suffer from rated through-current.

When forward short-circuit current is disconnected, a control system issues a switching-off action command to the high-speed mechanical switch S1 and the high-speed mechanical switch S2 simultaneously. When the high-speed mechanical switch S1 and the high-speed mechanical switch S2 are pulled apart for an opening distance within 2-5 ms, the thyristor component T1 and the thyristor component T3 are triggered to be switched on.

Current starts to be transferred to the current-limiting transfer branch, and the transferred current will freewheel through the thyristor component T3 after zero crossing of current in the high-speed mechanical switch S1 and the high-speed mechanical switch S2 of the main current branch. After zero crossing of freewheeling current, after the capacitor voltage rises, as voltage of the capacitor rises, and fault current is limited by the resistor R after the current enters the current-limiting transfer branch. When the current is limited, the magnitude of short-circuit current becomes smaller, and a DC component rapidly decays. The control system issues a switching command to the fast switch S3, and current in the fast switch S3 is subjected to arc extinguishing after zero crossing, thereby completing limiting and disconnection of the short-circuit current.

A value of the current-limiting resistor R is selected according to the rated voltage of the system, so that the short-circuit current subjected to current limiting is less than or equal to rated short-circuit disconnection current of a conventional medium-and-high-voltage vacuum circuit breaker, e.g., 31.5 kA, 40 kA, 50 kA, 63 kA, etc. However, the cost and volume will be increased if the selected current is higher. Taking 31.5 kA of current as an example, the resistance of the current-limiting resistor R is chosen to be 1-3 ohms.

In a preferred embodiment of the generator circuit breaker, in a reverse disconnection condition, the thyristor component T1 is triggered first, and the transfer capacitor C of the current-limiting transfer branch is discharged first. The current passes through the thyristor component T1 and the high-speed mechanical switch S1 and the high-speed mechanical switch S2 of the main current branch to complete one-time half-wave current oscillation. The voltage of the capacitor is reversed, and the thyristor component T1 is switched off after zero crossing of oscillating current. Then, the control system issues a switching action command to the high-speed mechanical switch S1 and the high-speed mechanical switch S2 simultaneously, and the thyristor component T2 and the thyristor component T4 are switched on when the high-speed mechanical switch S1 and the high-speed mechanical switch S2 are pulled apart for an opening distance within 2-5 ms.

Current starts to be transferred to the current-limiting transfer branch, and the transferred current will freewheel through the thyristor component T4 after zero crossing of current in the high-speed mechanical switch S1 and the high-speed mechanical switch S2 of the main current branch. After zero crossing of freewheeling current, after the capacitor voltage rises, as voltage of the capacitor rises, and fault current is limited by the resistor R after the current enters the current-limiting transfer branch. When the current is limited, the magnitude of short-circuit current becomes smaller, and a DC component rapidly decays. The control system issues a switching command to the fast switch S3, and current in the fast switch S3 is subjected to arc extinguishing after zero crossing, thereby completing limiting and disconnection of the short-circuit current.

In a preferred embodiment of the generator circuit breaker, the high-speed mechanical switch S1 and the high-speed mechanical switch S2 are vacuum switches based on an electromagnetic repulsion mechanism, and the number of the high-speed mechanical switches in parallel can be increased when the rated current and short-circuit current of the circuit breaker are higher.

In a preferred embodiment of the generator circuit breaker, the fast switch S3 is a vacuum fast switch.

In a preferred embodiment of the generator circuit breaker, the transfer capacitor C includes any one of or a combination of more of a thin film capacitor, an organic dielectric capacitor, an inorganic dielectric capacitor, an electrolytic capacitor, an electrothermal capacitor, and an air dielectric capacitor.

In a preferred embodiment of the generator circuit breaker, the thyristor component T3 and the thyristor component T4 in the freewheeling branch are formed by two antiparallel thyristor components. Further, the thyristor components T1 and T2 in the current-limiting transfer branch are constituted by two inverse-parallel thyristor components.

FIGS. 2(a)-2(h) show a process of disconnection of short-circuit current in particular when the short-circuit current is in a forward direction of the circuit breaker.

Figure 2A:
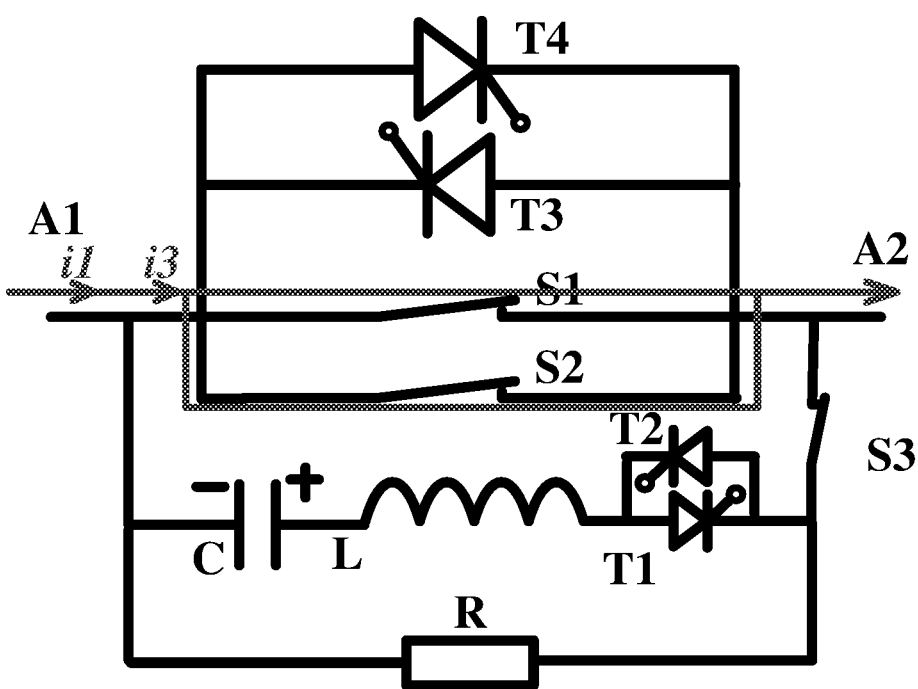
FIGS. 2(a) to 2(h) are schematic diagrams showing operation of a generator circuit breaker when in disconnection of a forward short-circuit current according to an embodiment of the present disclosure.

(1) As shown in FIG. 2(a), in a normal through-current state, system current flows in from a wire outlet end A1 and flows out from a wire outlet end A2 after passing through the high-speed mechanical switches in parallel.

Figures 2B, 2C:
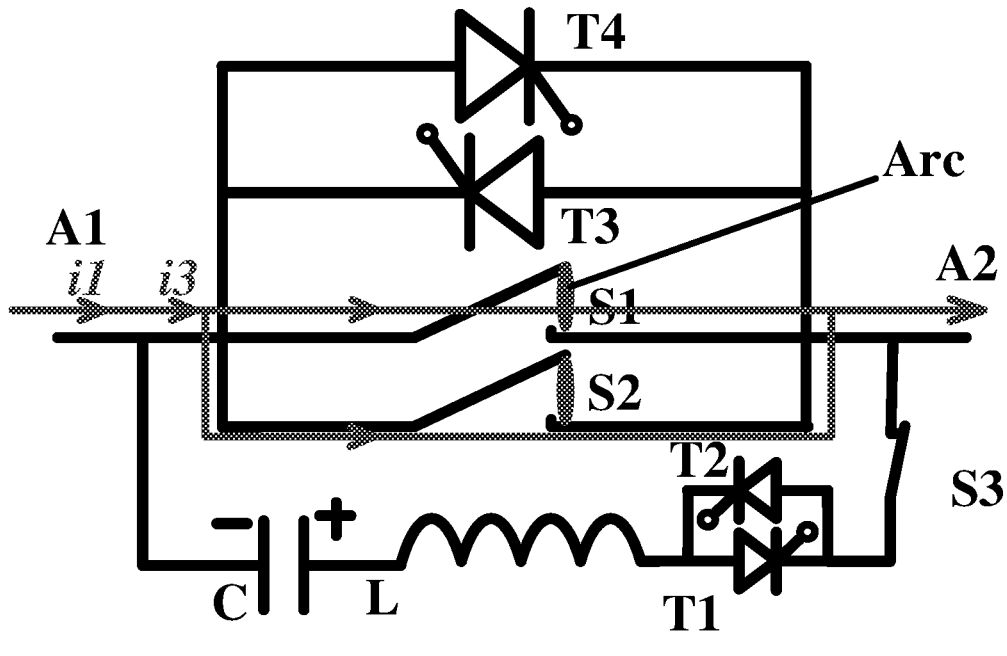

(2) As shown in FIG. 2(b), when a detection system detects that the system has a forward short-circuit fault, systemshort-circuit current is i1, and current of the main current branch is i3. The detection system notifies the control system of issuing a switching-off command, and the high-speed mechanical switch S1 and the high-speed mechanical switch S2 are switched on simultaneously, so as to start arc extinguishing.

(3) As shown in FIG. 2(c), when the high-speed mechanical switches S1 and S2 are pulled apart for a certain opening distance, the thyristor component T1 and the thyristor component T3 are triggered to be switched on, and the capacitor C starts to discharge through the thyristor component T1 and the high-speed mechanical switches S1 and S2 in the main current branch to form transferring current. The current i3 of the main current branch continuously decreases as the transferring current i2 constantly increases.

Figure 2D:
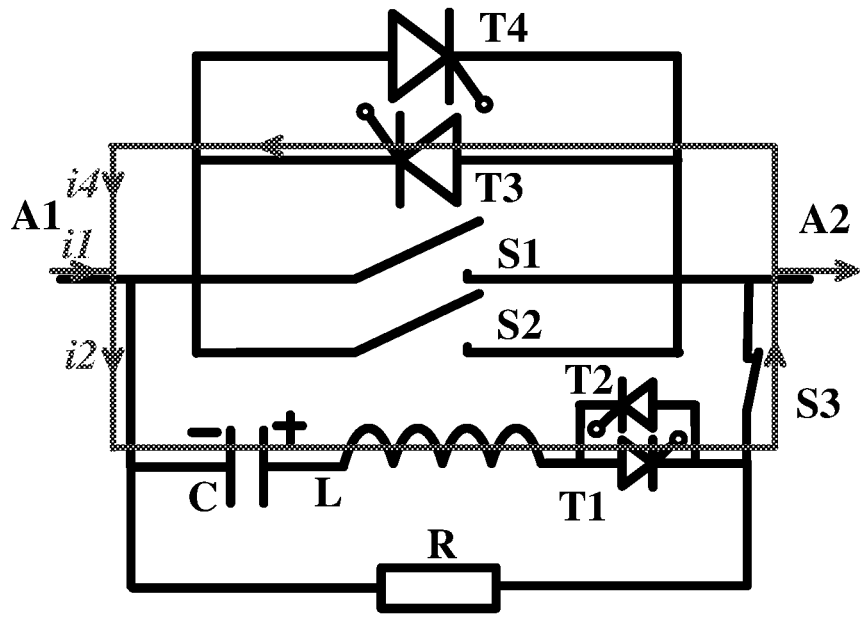

(4) As shown in FIG. 2(d), as the transferring current i2 constantly increases, the transferring current exceeding the system current i1 will freewheel through the thyristor component T3 when the magnitude of the transferring current i2 exceeds the system current i1, and the freewheeling current is i4.

Figure 2E:
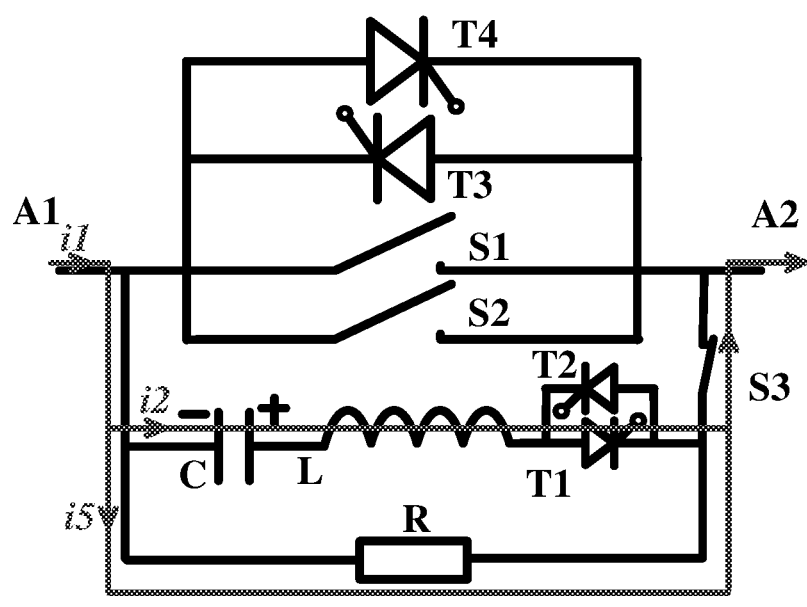

(5) As shown in FIG. 2(e), as the transferring current i2 starts to decrease after reaching the peak value, the thyristor component T3 is switched off after zero crossing of the freewheeling current i4 when the transferring current i2 is smaller than the system current i1, and the current enters the current-limiting resistor R, which is represented by i5.

Figure 2F:
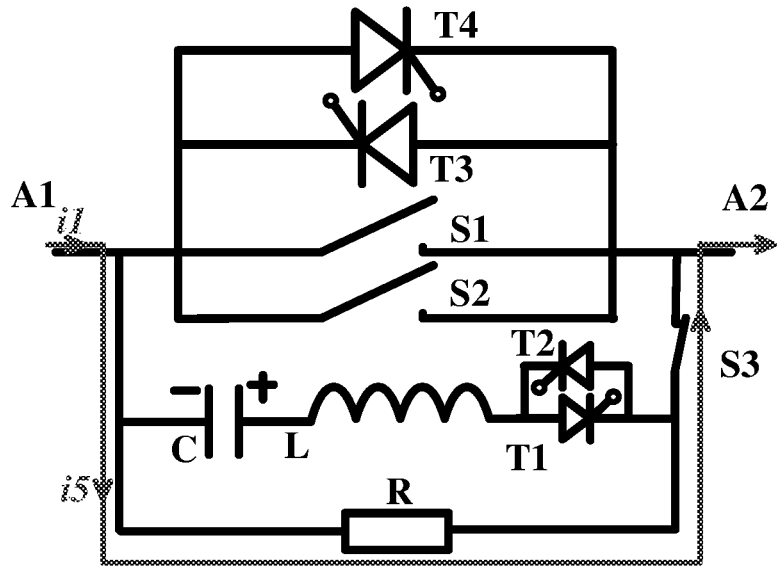

(6) As shown in FIG. 2(f), since an impedance value of the resistor R is much smaller than that of the inductor L and the transfer capacitor C in the current-limiting transfer branch, the system current i1 then substantially enters the branch for the resistor R, the current starts to be significantly limited, and the DC component rapidly decays to 0.

Figure 2:
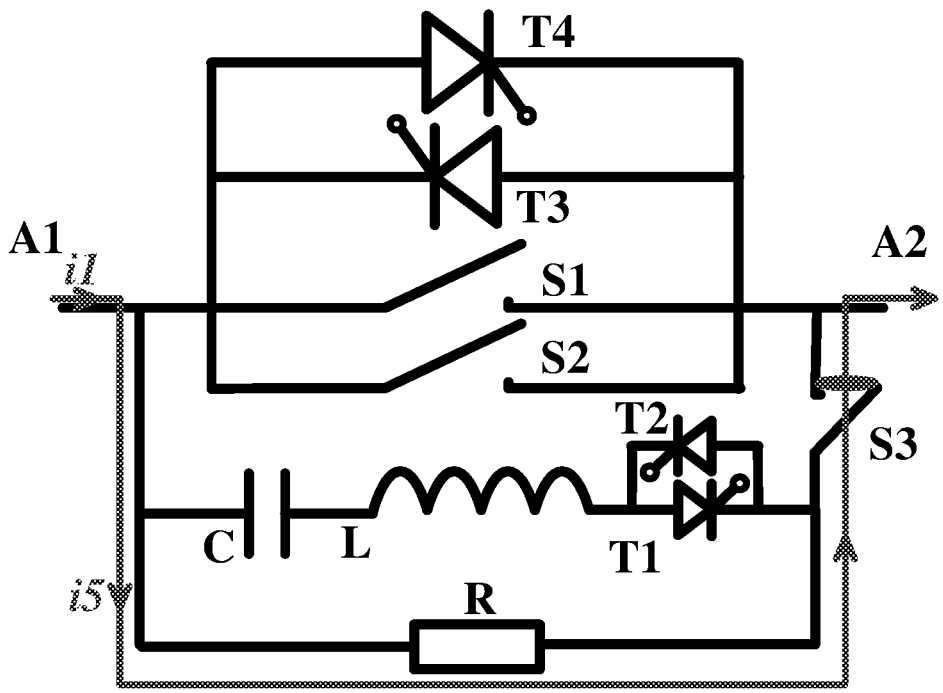
Figure 2H:
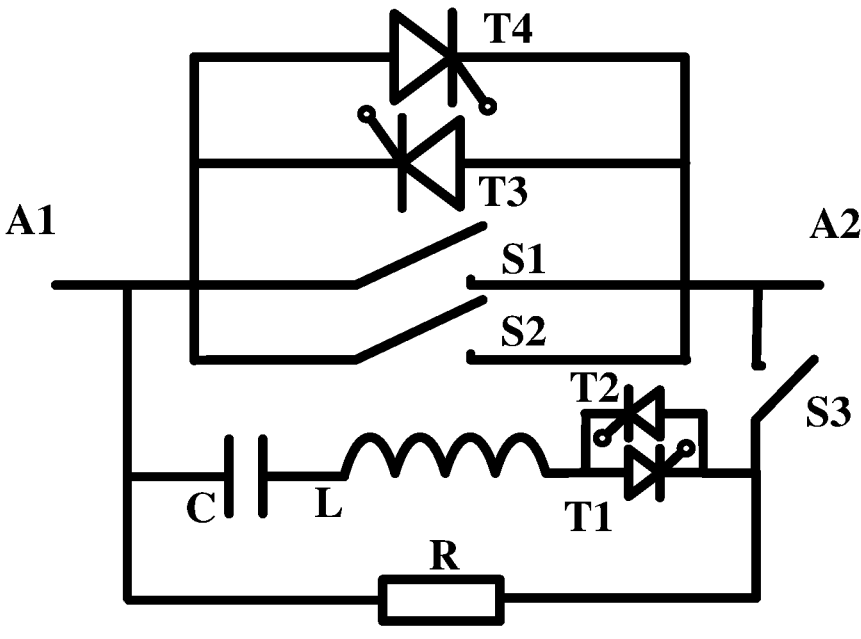

(7) As shown in FIG. 2(*g*), after the current starts to be significantly limited, the control system triggers the fast switch S3 to be switched off, which starts arcing.

(8) As shown in FIG. 2(*h*), the fast switch S3 starts arc extinguishing after zero crossing of the alternating current subjected to limiting, thereby completing disconnection of the short-circuit.

Figure 3:
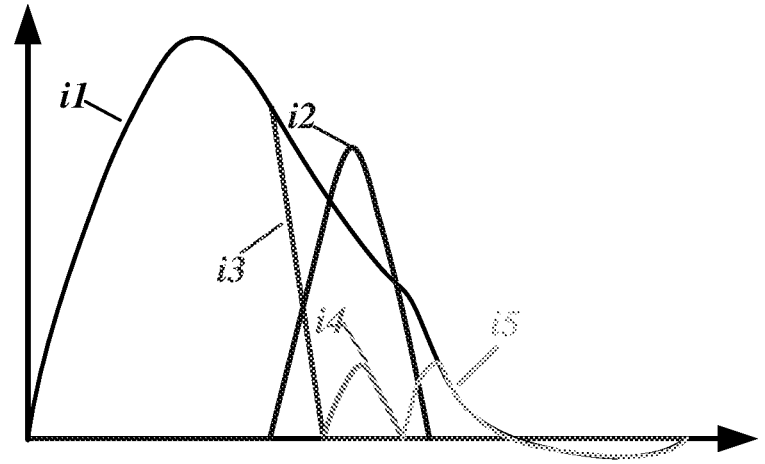
FIG. 3 is a schematic diagram showing a waveform when in disconnection of forward short-circuit current of a generator circuit breaker according to an embodiment of the present disclosure.

FIG. 3 is a schematic diagram showing a waveform when in disconnection of forward short-circuit current of the circuit breaker. A curve i1 is total current of the system. A curve i2 is transferring current of the current-limiting transfer branch for the inductor L and the transfer capacitor C. A curve i3 is current of the main current branch, i.e., break current. A curve i4 is freewheeling current. A curve i5 is current of the current-limiting transfer branch.

In fact, the alternating current of the generator circuit breaker is subjected to disconnection, and there is a forward direction and reverse direction of the alternating current. The drawings show a process of disconnecting reverse short-circuit current by the circuit breaker.

Figure 4:
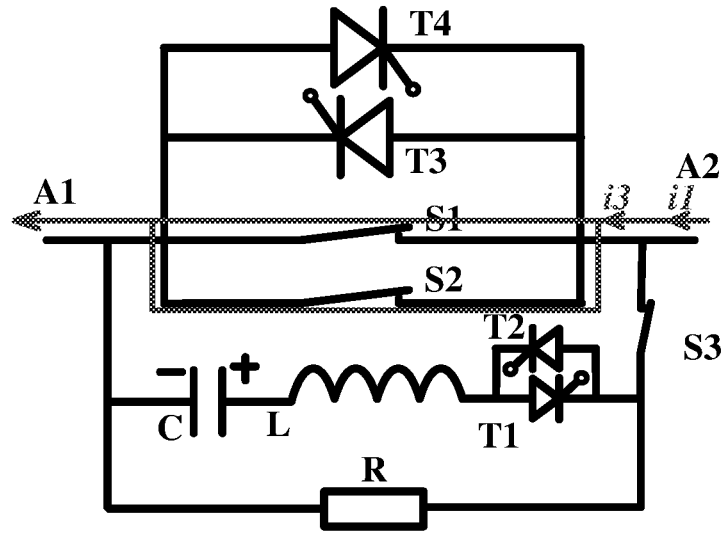
FIGS. 4(a) to 4(k) are schematic diagrams showing operation of a generator circuit breaker when in disconnection of reverse short-circuit current according to an embodiment of the present disclosure.
Figure 4B:
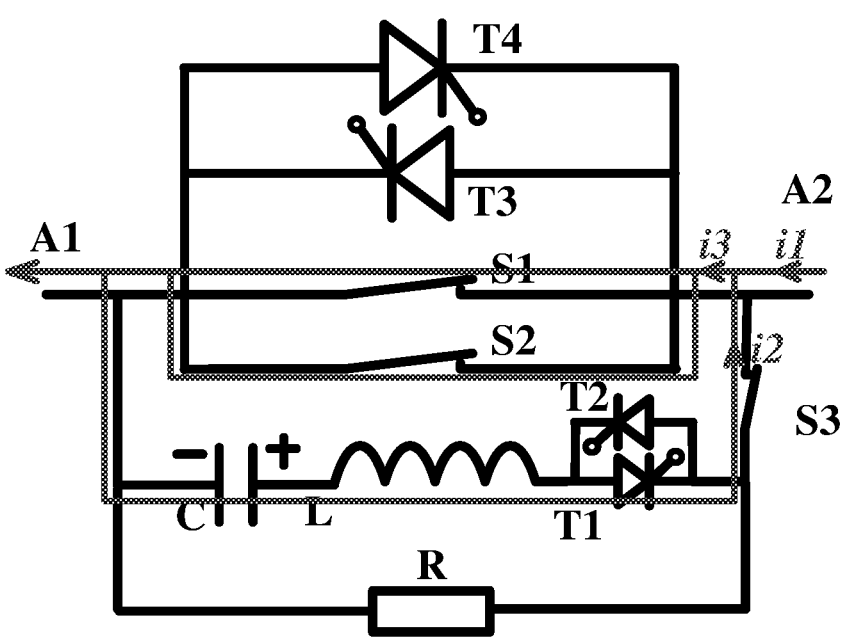
Figure 4C:
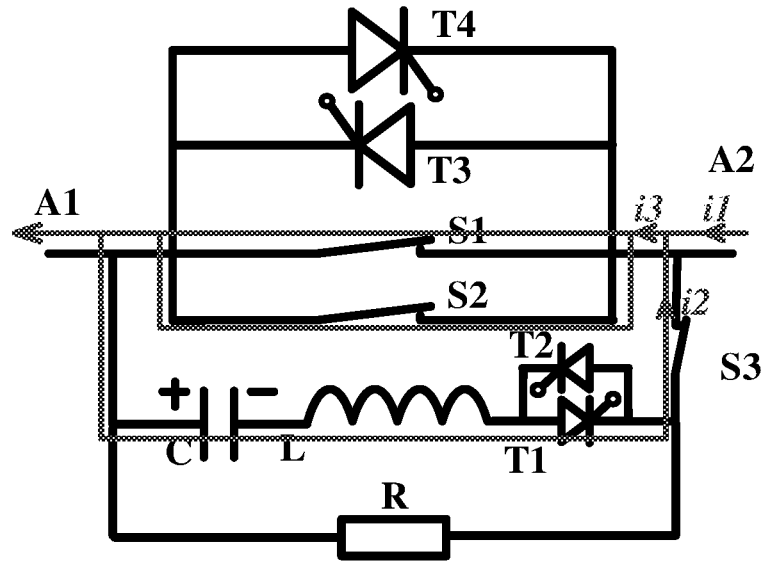
Figure 4D:
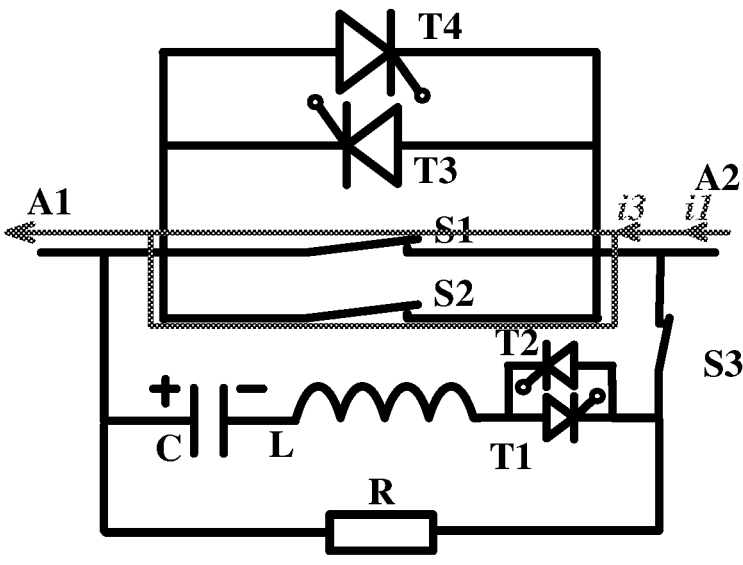
Figure 4E:
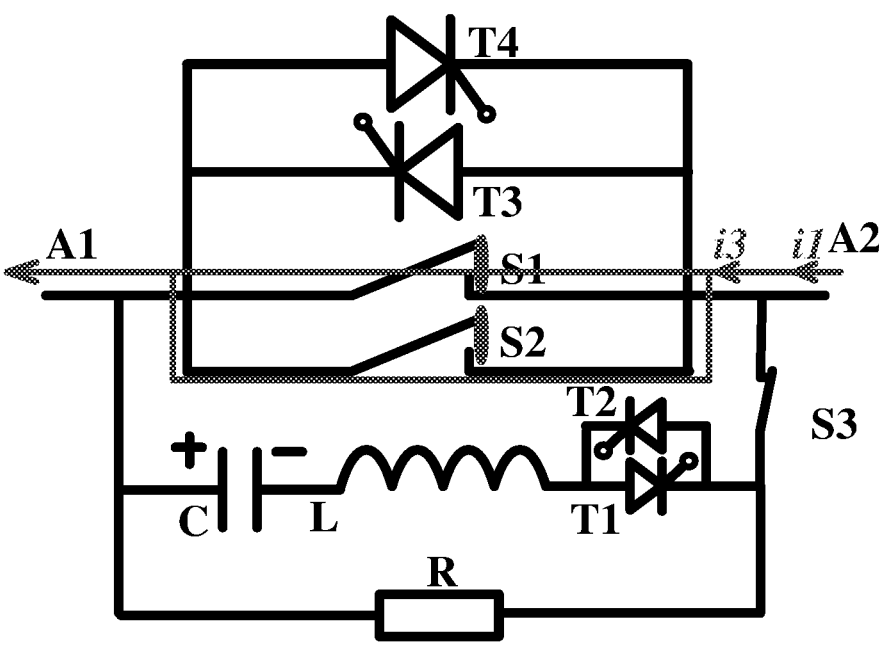
Figure 4F:
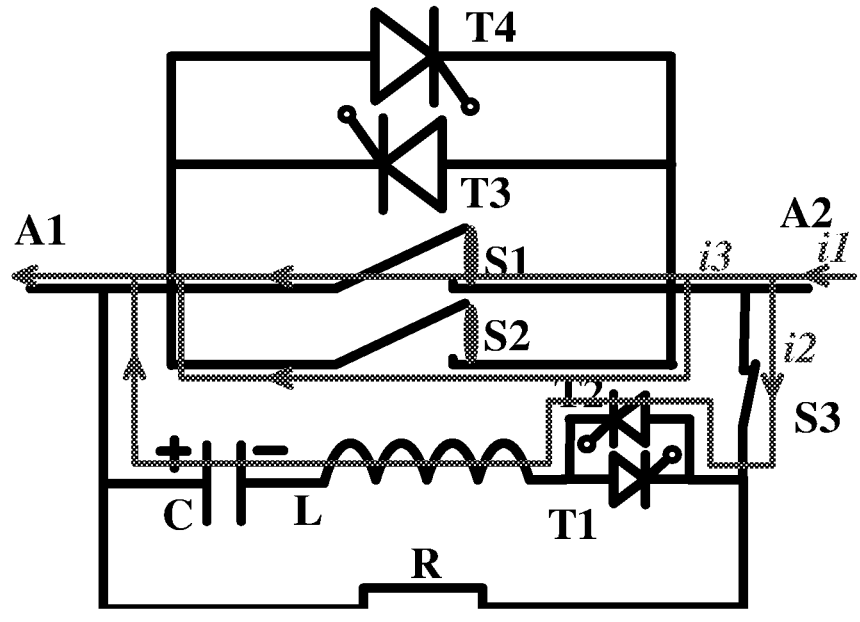
Figure 4G:
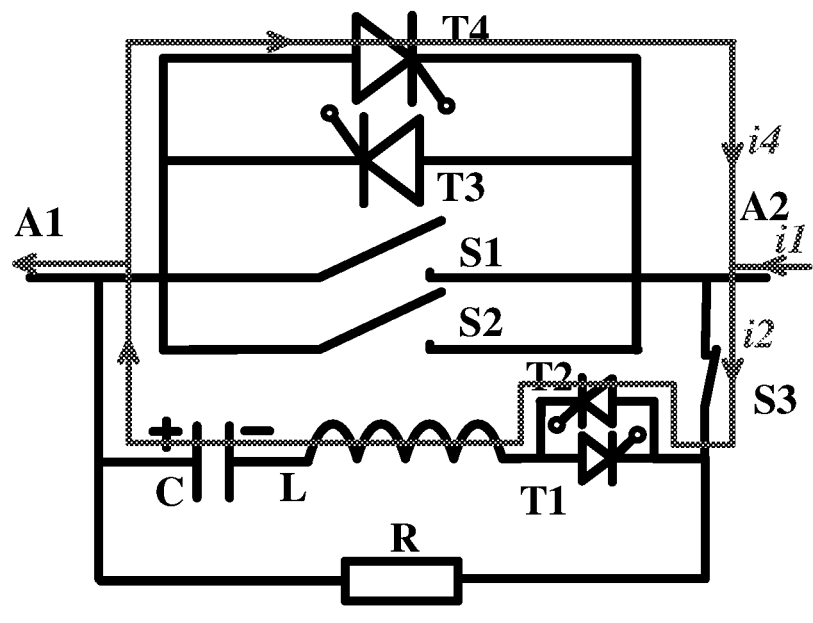
Figure 4H:
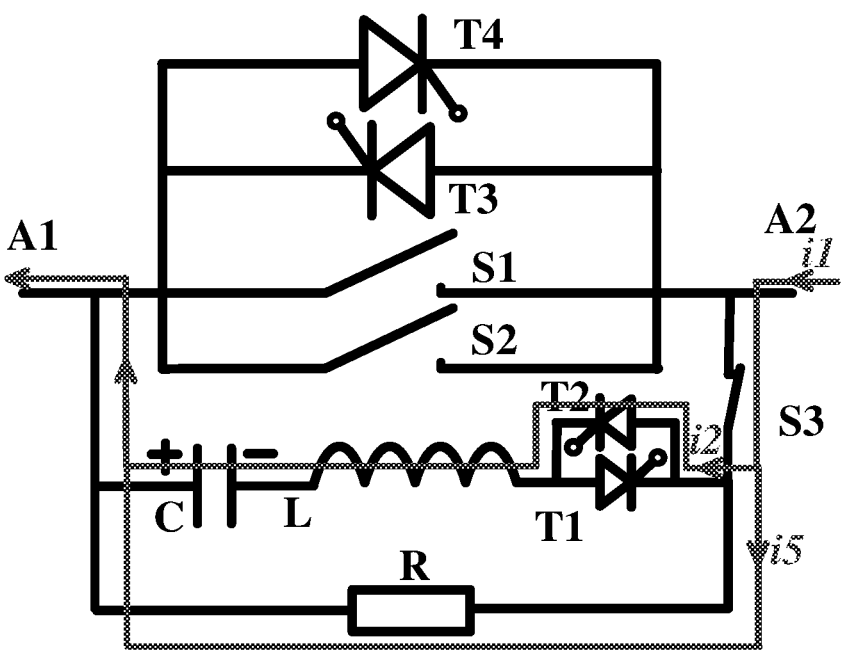
Figure 4I:
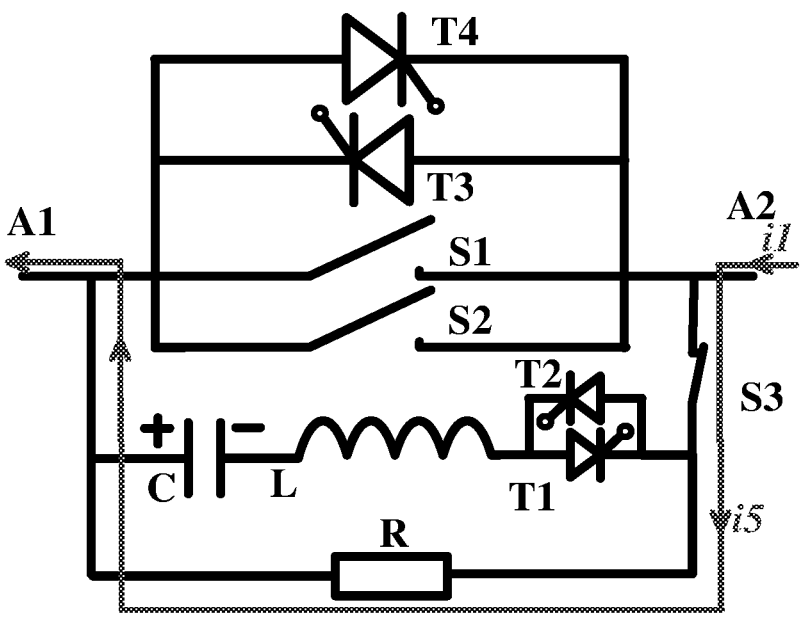
Figure 4J:
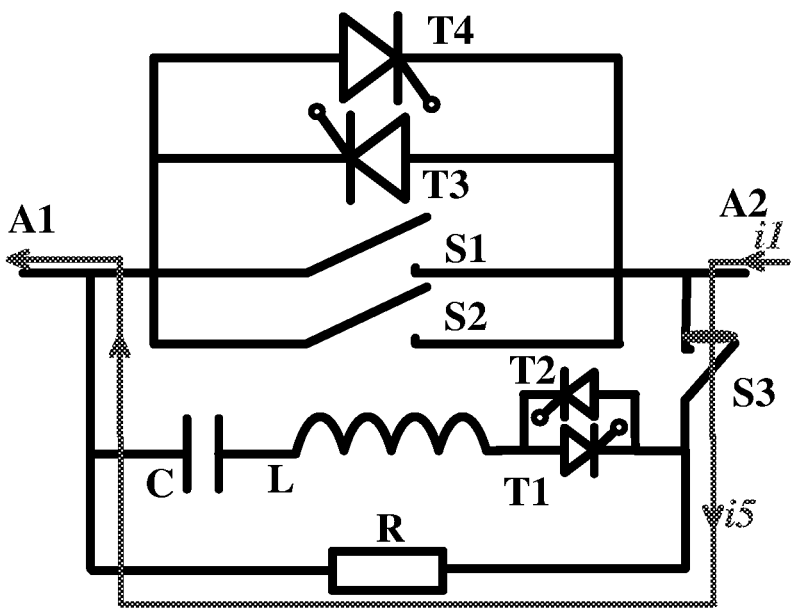
Figure 4K:
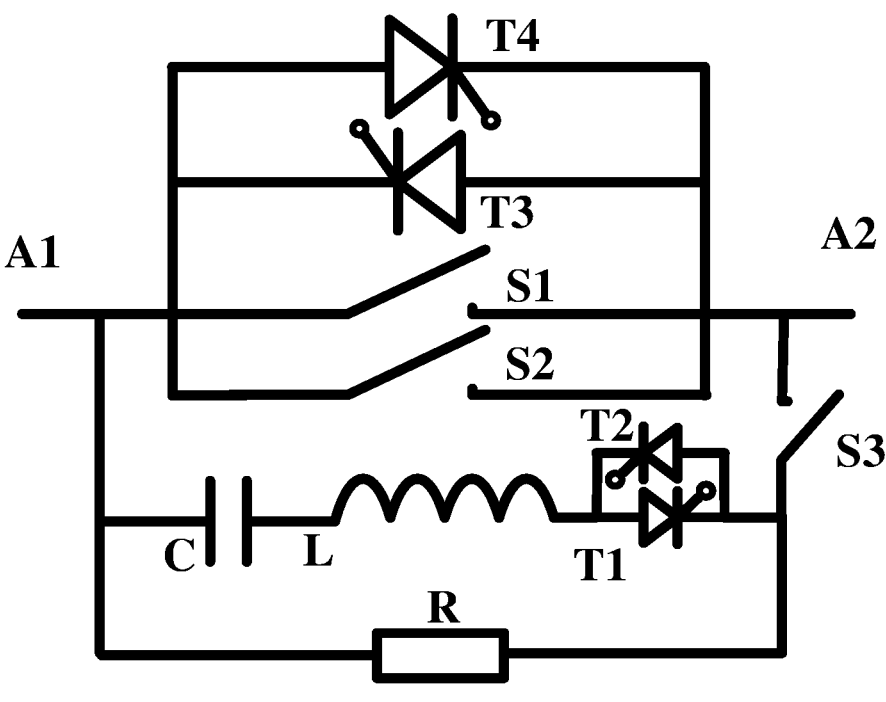

(1) As shown in FIG. 4(*a*), in the normal through-current state, the system current flows in from the wire outlet end A2 and flows out from the wire outlet end A1 after passing through the high-speed mechanical switches in parallel.

(2) As shown in FIG. 4(*b*), when the detection system detects the system has a reverse short-circuit fault, system short-circuit current is i1, and current of the main current branch is i3. The detection system notifies the control system to issue a command to make the thyristor component T1 to be switched on. The precharged capacitor C is negative on the left and positive on the right, and the capacitor starts to discharge through the thyristor component T1 and the high-speed mechanical switches S1 and S2 in the main current branch, forming oscillating current.

(3) As shown in FIG. 4(*c*), after the oscillating current reaches a peak value, the voltage of the capacitor C starts reversing to be positive on the left and negative on the right.

(4) As shown in FIG. 4(*d*), as the oscillating current crosses zero, the thyristor component T1 is switched off, the voltage of the capacitor C completes reversing, the short-circuit current is all present in the high-speed mechanical switches S1 and S2 in the main current branch.

(5) The subsequent action process is similar to the disconnection in the forward direction. As shown in FIG. 4(*e*), the system short-circuit current is i1, and the current of the main current branch is i3. The control system issues a switching command, and the high-speed mechanical switches S1 and S2 are simultaneously switched on, so as to start arc extinguishing.

(6) As shown in FIG. 4(*f*), when the high-speed mechanical switches S1 and S2 are pulled apart for a certain opening distance, the thyristor component T2 and the thyristor component T4 are triggered to be switched on, and the capacitor C starts to discharge through the thyristor component T2 and the high-speed mechanical switches S1 and S2 in the main current branch to form transferring current. The current i3 of the main current branch continuously decreases as the transferring current i2 constantly increases.

(7) As shown in FIG. 4(*g*), as the transferring current i2 constantly increases, the transferring current exceeding the system current i1 will freewheel through the thyristor component T4 when the magnitude of the transferring current i2 exceeds the system current i1, and the freewheeling current is i4.

(8) As shown in FIG. 4(*h*), as the transferring current i2 starts to decrease after reaching the peak value, the thyristor component T4 is switched off after zero crossing of the freewheeling current i4 when the transferring current i2 is smaller than the system current i1, and the current enters the current-limiting resistor R, which is represented by i5.

(9) As shown in FIG. 4(*i*), since an impedance value of the resistor R is much smaller than that of the inductor L and the transfer capacitor C in the current-limiting transfer branch, the system current i1 then substantially enters the branch for the resistor R, the current starts to be significantly limited, and the DC component rapidly decays to 0.

(10) As shown in FIG. 4(*j*), after the current starts to be significantly limited, the control system triggers the fast switch S3 to be switched off, which starts arcing.

(11) As shown in FIG. 4(*k*), the fast switch S3 starts arc extinguishing after zero crossing of the alternating current subjected to limiting, thereby completing disconnection of the short-circuit current.

Figure 5:
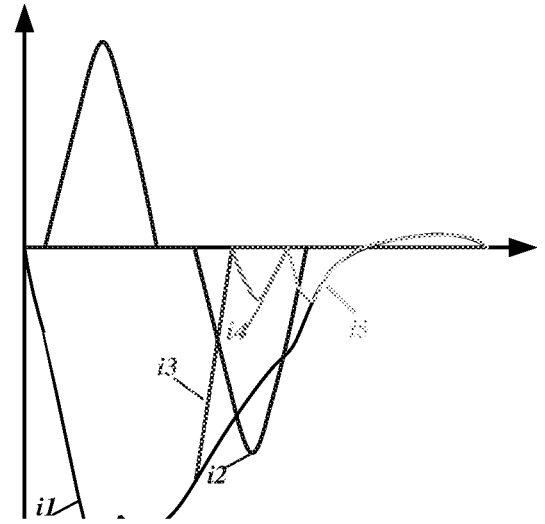
FIG. 5 is a diagram showing a waveform when in disconnection of reverse short-circuit current of a generator circuit breaker according to an embodiment of the present disclosure.

FIG. 5 is a schematic diagram showing a waveform when in disconnection of reverse short-circuit current of the circuit breaker. A curve i1 is total current of the system. A curve i2 is transferring current of the current-limiting transfer branch for the inductor L and the transfer capacitor C. A curve i3 is current of the main current branch, i.e., break current. A curve i4 is freewheeling current. A curve i5 is current of the current-limiting transfer branch.

Figure 6:
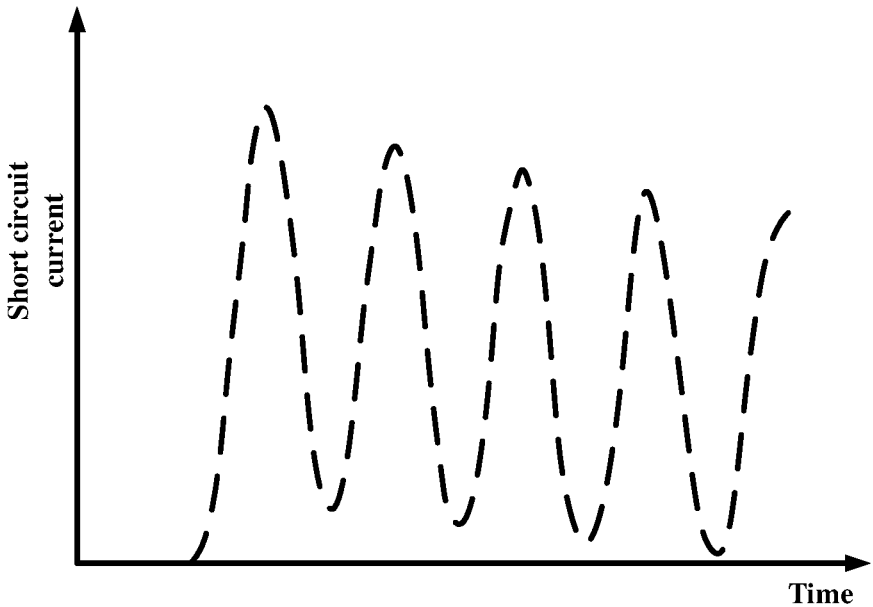
FIG. 6 is a schematic diagram of a delayed zero-crossing current waveform when a DC component is high after short-circuit current occurs in a system.

The short-circuit current of generators in large nuclear plants, hydroelectric plants, pyroelectric plants, or the like is exceptionally high, and has an effective value exceeding 210 kA and a peak value exceeding 575 kA, and meanwhile, has an exceptionally large DC component that has an asymmetrical coefficient exceeding 130%, resulting in a delayed zero crossing condition, as shown in FIG. 6. At present, circuit breakers with a short-circuit current disconnection capacity exceeding 210 kA are almost monopolized by ABB in Switzerland internationally, and have become a bottleneck technology in China. ABB employs an arc extinguishing solution with SF6 circuit breakers, which is the most advanced technology of ABB. The disconnection principle is that when a hydraulic spring mechanism is used to drive contacts to open, the SF6 gas blowing effect formed by a nozzle of an arc extinguishing chamber is used to realize arch extinguishing for disconnection when zero crossing of current. Since the SF6 AC circuit breaker relies on the spontaneous zero crossing of the short-circuit current, it is necessary to wait for the DC component to decay to form zero crossing when in disconnection, resulting in that the zero-crossing disconnection time is long, the extremely high short-circuit current duration will exceed 60 ms, which will cause a greater risk of short-circuit current shock to the system. Meanwhile, the mechanism stroke of the SF6 circuit breaker is long, the arcing time within the arc extinguishing chamber is long, and exceeds 25 ms, and the arc energy is extremely large, resulting in high difficulty in raising the disconnection capability, and short electrical endurance due to disconnection of short-circuit current. Moreover, the use

Figure 7:
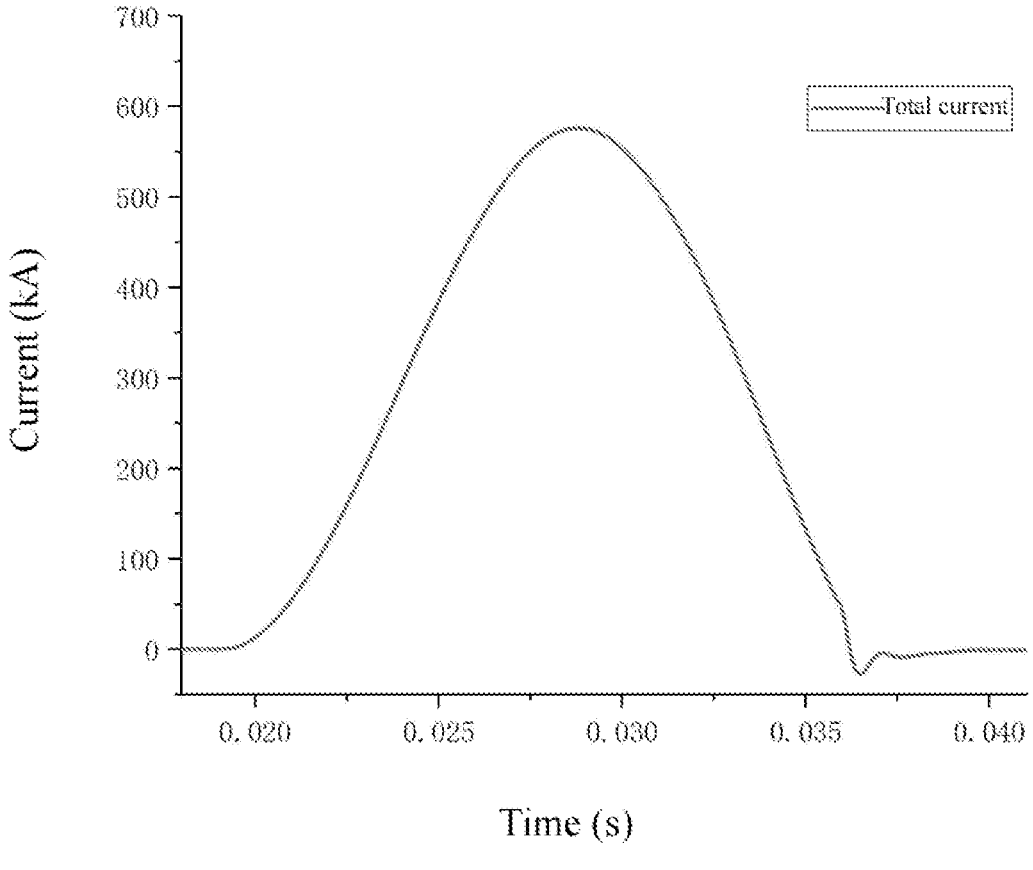
FIG. 7 is a schematic diagram showing a disconnection test on short-circuit current of 210 kA according to an embodiment of the present disclosure.

9 of SF6 gas as an arc extinguishing medium by the SF6 circuit breaker is not environmentally friendly, and does not comply with the development trend of environmental protection of China's power equipment. The present disclosure adopts different technical routes in which the high-speed mechanical switches are combined with the vacuum arc extinguishing chamber to serve as breaks of the main circuit. For the problem that a single vacuum arc extinguishing chamber does not have the adequate capability to achieve the disconnection of high current, the main current branch takes the form of a plurality of high speed vacuum switches in parallel, and the high speed vacuum switches in parallel operate synchronously, thereby solving the problem that the single vacuum arc extinguishing chamber has withstanding limit for high current. More importantly, the high-speed vacuum switches has short stroke and fast speed, and is combined with the current transferring and limiting effect to implement that the current of the main circuit is disconnected after zero crossing when the current is at the lowest valley after reaching the first peak value of the first short-circuit current, and short-circuit current limiting can be achieved by using the resistor R after current is transferred. Therefore, on the one hand, the short-circuit DC component rapidly decays to zero by means of an abrupt change in resistance; and on the other hand, and the short-circuit fault disconnection can be easily accomplished by making the magnitude of the short-circuit current become the magnitude of the rated current and using the fast switch S3 in the current-limiting transfer branch. Therefore, the generator circuit breaker provides a faster disconnection speed, and allows the duration of the extremely high short-circuit current in the system to be less than 20 ms, and enables a very short arcing time of the main break, which is less than 5 ms, thereby being highly advantageous to complete the disconnection task of the extremely high short-circuit current, and significantly reducing the impact of the high current on the system. The prototype now formed in accordance with the present disclosure has passed a disconnection test on short-circuit current of 210 kA at Xi'an High Voltage Apparatus Research Institute. As shown in FIG. 7, the short-circuit current occurs at 20 ms, and has an effective value being 210 kA, and the peak value of the short-circuit current reaches 576 kA due to the superposition of the DC component. The disconnection of the extremely high short-circuit current is achieved before 40 ms by using the disconnection method of the present disclosure.

Although the embodiments of the present disclosure have been described above with reference to the drawings, the present disclosure is not limited to the above specific embodiments and application fields, and the above specific embodiments are only illustrative, instructional, and not restrictive. Those of ordinary skill in the art, in the light of the present disclosure and without departing from the scope of the appended claims, will be able to make numerous forms that all fall within the scope of the present disclosure.

What is claimed is:

1. A generator circuit breaker, comprising:
a main current branch, a current-limiting transfer branch, a freewheeling branch and a fast switch, wherein
the main current branch comprises a high-speed mechanical switch S1 and a high-speed mechanical switch S2 in parallel, and two ends of breaks of the high-speed mechanical switch S1 and the high-speed mechanical switch S2 are directly connected with wire outlet ends of the circuit breaker respectively;
one end of the current-limiting transfer branch is connected in parallel to one end of the main current branch and the other end of the current-limiting transfer branch is connected with the other end of the main current branch via a fast switch S3, and the current-limiting transfer branch comprises a transfer capacitor C, an inductor L, a thyristor component T1, a thyristor componentT2, and a current-limiting resistor R; and
the freewheeling branch is connected in parallel across the main current branch and the current-limiting transfer branch, and the freewheeling branch comprises a thyristor component T3 and a thyristor componentT4.

2. The generator circuit breaker according to claim 1, wherein, preferably,
in the current-limiting transfer branch,
the transfer capacitor C and the inductor L are connected in series with the thyristor components T1 and T2, then are connected in parallel with the current-limiting resistor R, and subsequently are connected in series with the fast switch S3.

3. The generator circuit breaker according to claim 1, wherein
in a normal through-current state of a system, system current flows from the main current branch, and the high-speed mechanical switch S1 and the high-speed mechanical switch S2 suffer from rated through-current.

4. The generator circuit breaker according to claim 1, wherein
when forward short-circuit current is disconnected, a control system issues a switching-off action command to the high-speed mechanical switch S1 and the high-speed mechanical switch S2 simultaneously.

5. The generator circuit breaker according to claim 4, wherein
when the high-speed mechanical switch S1 and the high-speed mechanical switch S2 are pulled apart for an opening distance within 2-5 ms, the thyristor component T1 and the thyristor component T3 are triggered to be switched on; and
current starts to be transferred to the current-limiting transfer branch and freewheels through the thyristor component T3; after zero crossing of freewheeling current, as voltage of the capacitor rises, the current enters the current-limiting transfer branch, and fault current is limited; and when the current is limited, the control system issues a switching command to the fast switch S3, and the current in the fast switch S3 is subjected to arc extinguishing after zero crossing, thereby completing limiting and disconnection of short-circuit current.

6. The generator circuit breaker according to claim 2, wherein
in a reverse disconnection condition, the thyristor component T1 is triggered first, the current-limiting transfer branch for the inductor L and the transfer capacitor C is subjected to one-time current oscillation first, the voltage of the capacitor is reversed, and the thyristor component T1 is switched off after zero crossing of current; afterwards, the control system issues a switching-off action command to the high-speed mechanical switch S1 and the high-speed mechanical switch S2 simultaneously, and the thyristor component T2 and the thyristor component T4 are triggered to be switched on when the high-speed mechanical switch S1 and the high-speed mechanical switch S2 are pulled apart for an opening distance within 2-5 ms; and
current starts to be transferred to the current-limiting transfer branch for the inductor L and the capacitor C, and freewheels through the thyristor component T4; after zero crossing of freewheeling current, as voltage of the capacitor rises, the current enters the current-limiting transfer branch, and fault current is limited; and when the current is limited, the control system issues a switching command to the fast switch S3, and current in the fast switch S3 is subjected to arc extinguishing after zero crossing, thereby completing limiting and disconnection of short-circuit current.

7. The generator circuit breaker according to claim 1, wherein the high-speed mechanical switch S1 and the high-speed mechanical switch S2 are vacuum switches based on an electromagnetic repulsion mechanism; and when the rated current and the short-circuit current increase, the number of the high-speed mechanical switches in parallel can be increased according to current demands.

8. The generator circuit breaker according to claim 1, wherein the fast switch S3 is a vacuum fast switch.

9. The generator circuit breaker according to claim 1, wherein the transfer capacitor C comprises any one of or a combination of more of a thin film capacitor, an organic dielectric capacitor, an inorganic dielectric capacitor, an electrolytic capacitor, an electrothermal capacitor, and an air dielectric capacitor.

* * * * *